United States Patent [19]

Takahashi et al.

[11] Patent Number: 4,858,466
[45] Date of Patent: Aug. 22, 1989

[54] MEASURING APPARATUS OF VOLUME OF AN INJECTED FLUID

[75] Inventors: Takeshi Takahashi, Mishima; Naoyuki Tsuzuki, Susono; Yukimitsu Omori, Kawasaki; Akio Takamura, Yokohama, all of Japan

[73] Assignees: Toyota Jidosha Kabushiki Kaisha, Toyota; Ono Sokki Co., Ltd., Tokyo, both of Japan

[21] Appl. No.: 193,531

[22] Filed: May 13, 1988

[30] Foreign Application Priority Data

May 15, 1987 [JP] Japan .................. 62-119197

[51] Int. Cl.$^4$ .......................................... G01M 15/00
[52] U.S. Cl. ................................................. 73/119 A
[58] Field of Search ............ 73/119 A, 861.01, 861.02, 73/861.42, 861.47, 232, 239, 269, 271, 262–267; 324/207, 208

[56] References Cited

U.S. PATENT DOCUMENTS

| | | | |
|---|---|---|---|
| 3,234,785 | 2/1966 | Rimsha | 73/269 |
| 3,371,272 | 2/1968 | Stanton | 324/207 |
| 4,212,200 | 7/1980 | Rousseau et al. | 73/861.47 |
| 4,391,133 | 7/1983 | Ito | 73/119 A |
| 4,461,169 | 7/1984 | Augustin | 73/119 A |
| 4,546,648 | 10/1985 | Abt | 73/119 A |

FOREIGN PATENT DOCUMENTS 58-37485 8/1983 Japan .
61-1862 1/1986 Japan .

Primary Examiner—Stewart J. Levy
Assistant Examiner—Robert R. Raevis
Attorney, Agent, or Firm—Cushman, Darby & Cushman

[57] ABSTRACT

A measuring apparatus of a volume of a fluid injected from an injection valve. A fluid having a volume V is injected from an injection valve into an injection chamber containing a fluid, same kind as that of the injected fluid, and having a predetermined pressure and volume. A back pressure chamber is formed separately in the injection chamber with a parting plate having an effective under-pressure area A and a bellow sealed and connected, at one end thereof, to the parting plate. In the back pressure chamber a non-contact displacement sensor having a thermal compensation device is disposed with a clearance from the parting plate and the bellow and the back pressure chamber is filled with another fluid having same pressure as that of fluid in the injection chamber. By the injection of the fluid into the injection chamber, the parting plate moves toward the non-contact displacement sensor by a distance S which is equal to V/A. Distance S is detected by the non-contact displacement sensor. So the volume (V=A×S) of the fluid injected from the injection valve is measured easily and precisely without being affected by temperature variation.

12 Claims, 4 Drawing Sheets

MEASURING APPARATUS OF VOLUME OF AN INJECTED FLUID

BACKGROUND OF THE INVENTION

This invention relates to a measuring apparatus of a volume of fluid such as fuel injected from an injection valve. More specifically, this invention relates to an apparatus which precisely measures the volume of the fluid injected from an injection valve to be measured under the conditions conforming to the actual injection of the fluid.

When the injection valve supplies fuel to a combustion chamber of an engine, for example, a diesel engine and an electronically-injected gasoline engine, the injected fuel volume should be precisely controlled. Consequently, for the design, development and inspection of such a control system, it has previously been proposed to provide a precise measuring apparatus of a volume of an injected fuel.

When the injection valve injects fuel into a combustion chamber in which pressure is maintained at a predetermined value, the injected volume of the fuel is determined by measuring the increment of the chamber volume (Japanese published examined patent application No. 58-37485). The injection chamber is pressurized in advance to avoid a measurement error caused by the contraction of gas mixed in the fuel injected into the chamber.

In this method, the increment of the injection chamber volume is determined by measuring the displacement of the piston. As an additionally disclosed method, the injection chamber is partitioned with bellows (or a diaphragm) and a circular plate, and the displacement of circular plate determines the volume of the fuel injected into the injection chamber. This method has advantages; fluid does not leak from the injection chamber, the inertia force of a movable member used in this method is small, and no friction arises between the circular plate and the wall of the injection chamber.

In the diesel or gasoline engine cylinder into which the injection valve to be measured actually injects fuel, the pressure therein becomes high, varying in a wide range between 30 and 150 kg/cm$^2$. The pressure in the injection chamber influences the volume of injected fuel. Consequently, when the pressure in the injection chamber is maintained constant as aforementioned, the problem is that the volume of fuel injected under actual injection condition cannot be precisely measured.

The bellows or diaphragm system has advantages as described above. But when the bellows or diaphragm deforms slightly as the pressure in injection chamber rises at the time of fuel injection, the problem is that the increment of the injection chamber volume is not proportional to the displacement of the circular plate. Further, the injection pressure transversely displaces or inclines the bellows, resulting in a measurement error.

In the prior art, to measure the displacement of the circular plate, the movement of a rod attached thereto is detected by a differential transformer. But as the rod displaces with the circular plate, the inertia force of the movable portion is large, resulting in an ineffectiveness for measuring the volume of the fuel injected from the injection valve at high frequency. Moreover, temperature drift increases because of the thermal expansion of the rod. For a zero point adjustment, the circular plate contacts a stopper while the fluid is not injected. Measurement of the volume of the fuel injected from the injection valve at high frequency is difficult due to the vibration caused by such a contact.

SUMMARY OF THE INVENTION

A primary object of this invention is to provide a measuring apparatus of a volume of fluid injected by an injection valve to be measured under the conditions similar to the actual injection of the fluid.

Another object of this invention is to provide a measuring apparatus of the volume of an injected fluid in which the displacement member hardly deforms and by which precise measurement is attained.

A further object of this invention is to provide a measuring apparatus which can precisely measure volume of a fluid injected from an injection valve at high frequency.

Still a further object of this invention is to provide a measuring apparatus which can exactly measure a volume of a fluid injected from an injection valve in a varying range of temperature.

In general, the foregoing and other objects will be carried out by providing a measuring apparatus of a volume of an injected fluid comprising: a back pressure chamber in which a pressure corresponding to a condition for measuring the volume of a fluid injected from an injection valve to be measured is maintained; an injection chamber which is filled with said fluid injected from said injection valve to be measured; a movable member which moves a distance corresponding to an increment of volume of said injection chamber due to the ignition of fluid from said injection valve to be measured and partitions said back pressure chamber from said injection chamber with same pressure; means for measuring a displacement of said movable member; and means for controlling a volume of said fluid to be discharged from said injection chamber so that said movable member remains in a predetermined zone during non-injection of said injection valve to be measured.

BRIEF DESCRIPTION OF THE DRAWING

This invention may be best understood by referring to the following description of the preferred embodiment and the drawings in which.

DETAILED DESCRIPTION OF THE PREFERRED EMBODIMENT

An embodiment of this invention will be described hereunder with reference to the drawings.

Figure 2:
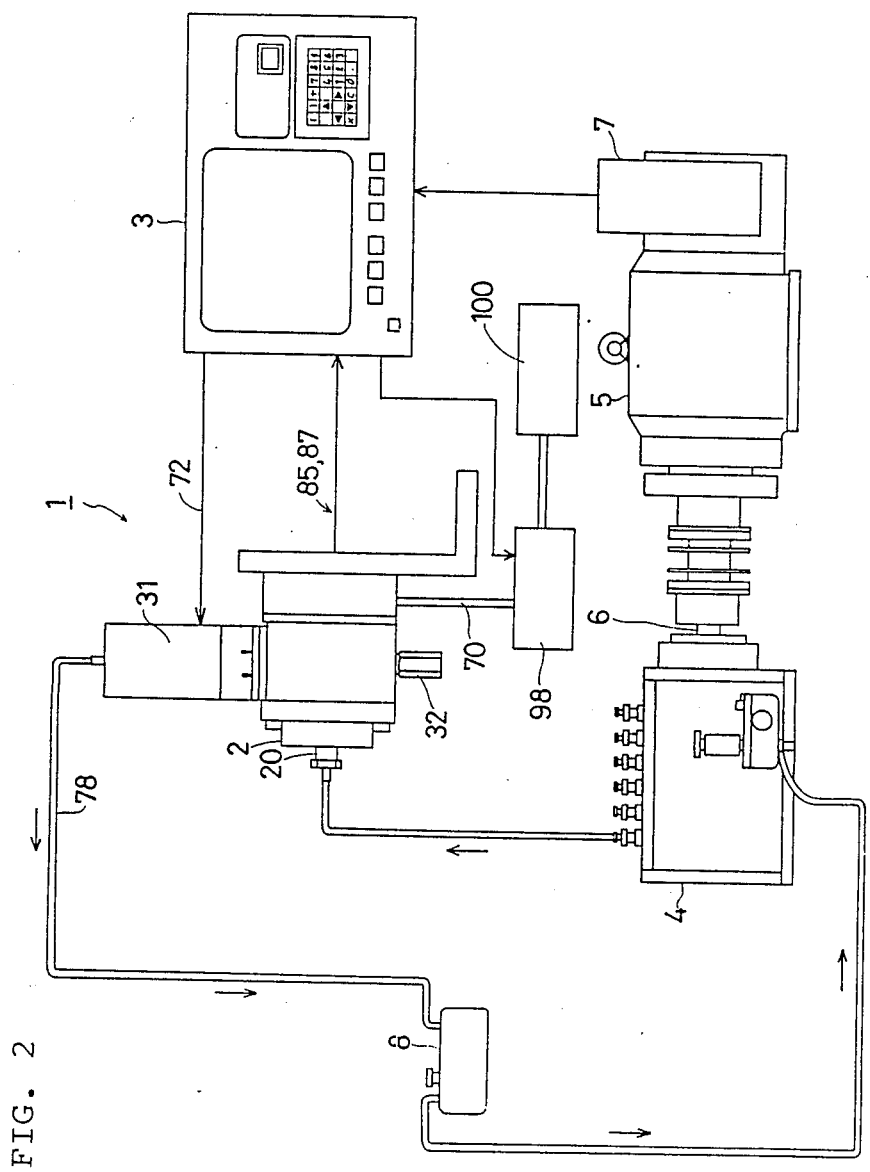
FIG. 2 is a schematic view illustrating a whole system of the embodiment according to the present invention for measuring the volume of the fuel injected from an injection valve and including the measuring apparatus of FIG. 1.

Referring to FIG. 2, a measuring system of injected fuel volume 1 comprises a sensing portion 2 and a measurement controller 3. An injection pump 4 for diesel engine is fixed on a testing bench. In the system 1, instead of a diesel engine, a motor 5 is connected to a drive shaft 6 of the injection pump 4, adjusting a testing condition. On a rotating shaft of the motor 5, an angle sensor 7 is provided which detects the rotational speed of motor 5, a cylinder into which fuel was injected and a top dead point of the piston, and transmits them to the measurement controller 3.

The injection pump 4 takes in fuel from a tank 8, pressurizes and supplies the fuel to an injection valve 20 attached to the sensing portion 2. FIG. 2 shows only one of the multiple injection valves 20 attached to the sensing portion 2. The sensing portion 2 detects the volume of fuel injected from the injection valve 20, and sends a signal corresponding to the injected volume of fuel to the measurement controller 3.

On the other hand, in response to the drive signal received from the measurement controller 3, the sensing portion 2 discharges the fuel injected therein. The discharged fuel from the sensing portion 2 returns to the tank 8.

Figure 1:
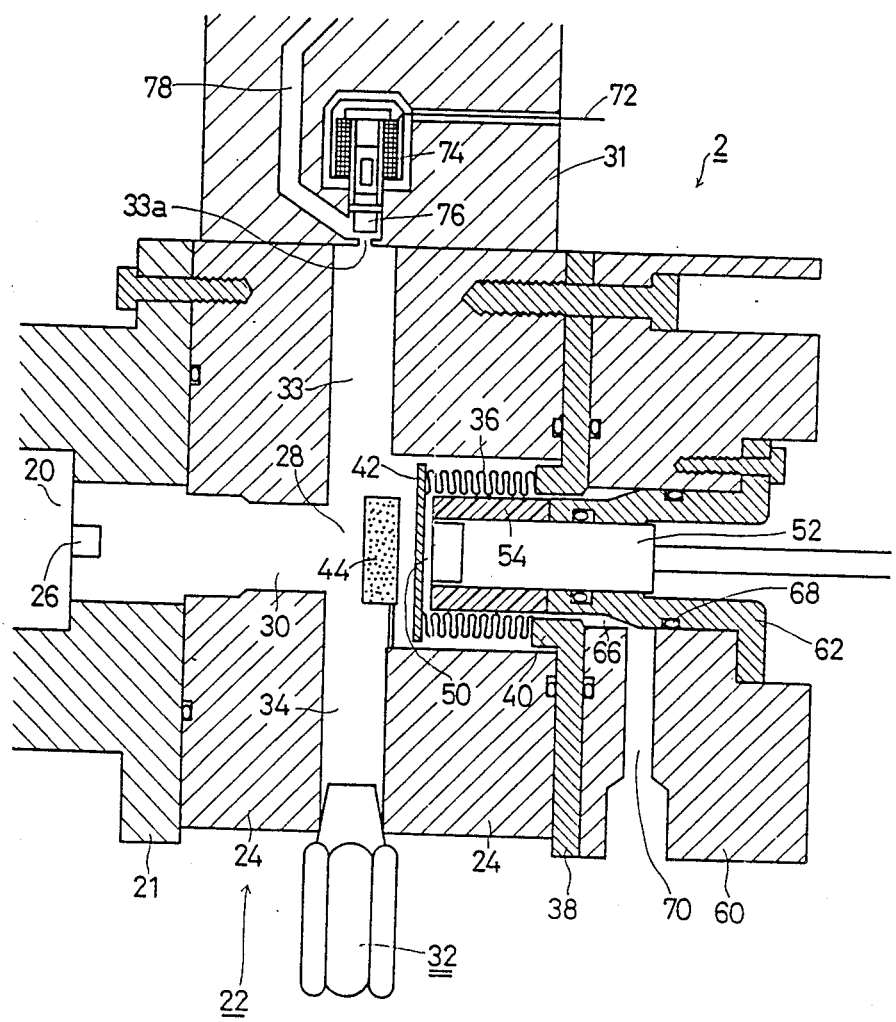
FIG. 1 is a sectional view of a measuring apparatus of volume of a fuel injected from an injection valve for a diesel engine as a preferred embodiment of the present invention.

In FIG. 1 the sensing portion 2 comprises the injection valve 20 and a measuring apparatus of volume of injected fuel 22. The injection valve 20 is attached to a lower body 24 of the measuring apparatus 22 via an adapter 21. An injection port 26 opens toward an injection chamber 28 in the lower body 24 of the measuring apparatus 22. The injection chamber 28, which is a cylindrical channel located nearly at the center of the lower body 24, leads horizontally to the injection port 26 through a passage 30, up to a discharge valve 31 through a passage 33 and down to a safety valve 32 through a passage 34.

At the opposite side of the injected port 26, a bellows 36 which is cylindrical is positioned at a little clearance from the cylindrical inner wall of the lower body 24. An end of the bellows 36 is sealed and secured to a disk-type flanged portion 40 of a fixing member 38. The other end of the bellows 36 is sealed and secured to a parting plate 42 which is a thin disk made of steel. Between the parting plate 42 and the injection port 26, a vibration-damping member 44 which is a porous and sintered metallic material is secured to the lower body 24.

In the middle of a back pressure chamber 50 separated from the injection chamber 28 with bellows 36 and parting plate 42, a non-contact displacement sensor 52 is provided to measure the displacement of the parting plate 42. Between the non-contact displacement sensor 52 and the bellows 36, a collar 54 is inserted which is made of non-magnetic material such as rigid plastic. The collar 54 prevents the bellows 36 from vertically deforming in FIG. 1 due to a rise of the pressure in the injection chamber 28.

An upper body 60 is fixed to the right side of the lower body 24, containing the fixing member 38 therebetween. The upper body 60 contains in the middle thereof the non-contact displacement sensor 52 and a positioning member 62 thereof. Between the positioning member 62 and the upper body 60, a narrow clearance 66 communicates with the back pressure chamber 50. The right side of the narrow clearance 66 is sealed by an O ring 68 inserted between the positioning member 62 and the upper body 60. The narrow clearance 66 opens to a pressure passage 70 in the upper body 60. The pressure passage 70 leads to a large reservoir tank 100 via a pressure regulator 98.

The discharge valve 31 contains an electromagnetic valve 74 connected to the measurement controller 3 by a lead wire 72. A valve body 76 of the electromagnetic valve 74 opens or closes a port 33a between the passage 33 to the injection chamber 28 and a passage 78 to the tank 8.

Figure 3:
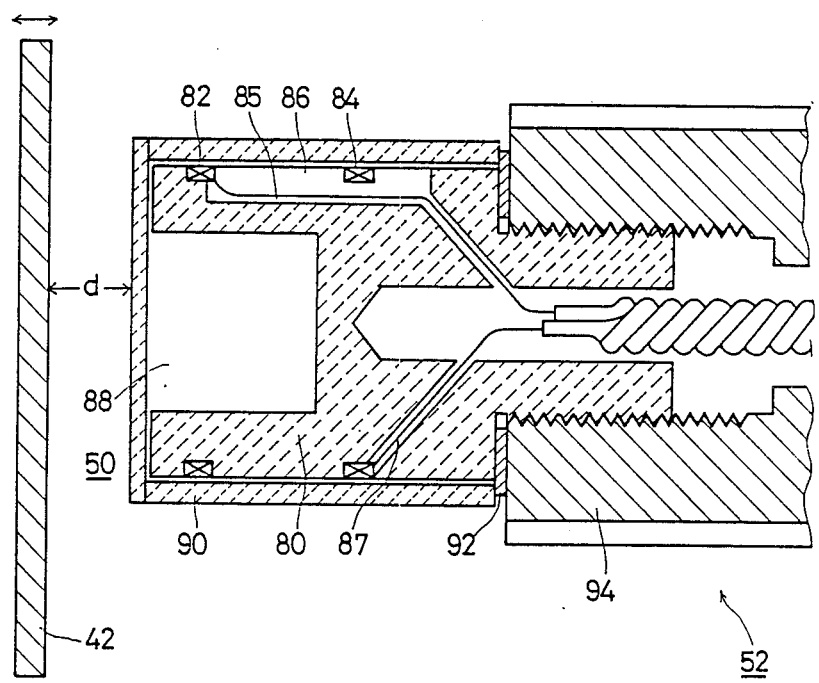
FIG. 3 is a sectional view of a displacement sensor used for the measuring apparatus shown in FIG. 1.

In FIG. 3, the non-contact displacement sensor 52 comprises a ceramic bobbin 80 which is cylindrically wound with a sensor coil 82 at the side of parting plate 42 and a reference coil 84 for compensating temperature at the right side thereof. A lead wire 85 for the sensor coil 82 goes through a clearance 86. A lead wire 87 for the reference coil 84 goes through the bobbin 80. The lead wires 85 and 87 meet in the middle of the bobbin 80, run together toward the right side and connect with the measurement controller 3 as shown in FIG. 2. In the left part of the bobbin 80, air space 88 is centered to dissipate heat to prevent the bobbin 80 from being damaged due to heat at the time of molding and using. The bobbin 80 wound with the coils 82 and 84 is housed in a ceramic case 90. The ceramic case 90 is screwed and adhered to a sensor body 94 via a reference washer 92. The reference washer 92 is used together with the reference coil for detecting induction as later described. The material of the reference washer 92 is the same as that of the parting plate 42.

In operation, a fluid having a pressure corresponding to a measuring condition is supplied from the reservoir tank 100 through the pressure passage 70 to the back pressure chamber 50. The reservoir tank is filled in advance with nitrogen gas of the pressure suitable for the measuring condition. The capacity of the reservoir tank is more than 100 times as large as the volume of fuel injected once from the injection port 26. To predetermine the pressure of the supply fluid in the back pressure chamber 50, at first an actual pressure in an engine combustion chamber wherein the injection valve 20 injects fuel is assumed to be in the range from atmospheric pressure to about 150 kg/cm$^2$. A proper pressure of the supply fluid is selected from that range according to a measured engine pressure condition. Regarding the fluid to be supplied to the back pressure chamber 50, besides the prescribed nitrogen gas, air, helium, etc. can also be used. On the other hand, the injection chamber 28 is filled with fuel injected from the injection valve 20. The volume of fuel in the injection chamber 28 is adjusted by the discharge valve 31 so that the parting plate 42 floats in the injection chamber 28 without contacting anywhere except for the bellows 36. The pressure in the injection chamber 28 is thus kept the same as that in the back pressure chamber 50.

Figure 4:
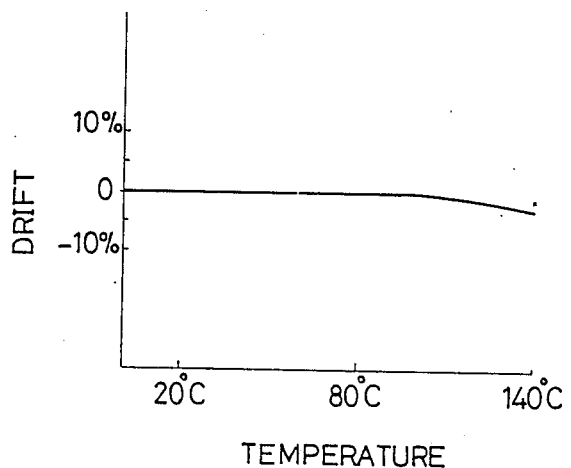
FIG. 4 is a graph showing the relationship between an ambient temperature and a drift (output) of the displacement sensor.
Figure 5:
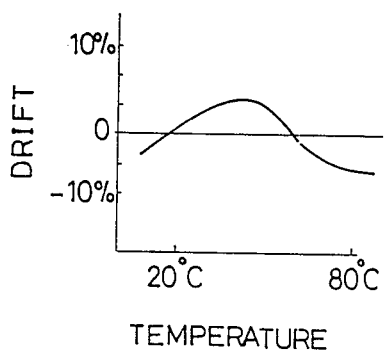
FIG. 5 is a graph showing the temperature and drift of the prior displacement sensor without a reference coil.

The non-contact displacement sensor 52 detects the position of the parting plate 42 while the injection valve 20 does not inject fuel. When exciting current of high frequency is supplied to the sensor coil 82 of displacement sensor 52, the line of magnetic force induces current in the parting plate 42 because the material thereof is steel. The induced current influences the distribution of line of magnetic force, and the inductance of the sensor coil 82 changes. The inductance varies with the distance between the sensor coil 82 and the parting plate 42. The measurement controller 3 detects the position of the parting plate 42 by measuring the inductance of the sensor coil 82. Regarding the material of the parting plate 42, other than thin steel, any material that induces current due to the line of magnetic force formed by sensor coil 82, can be used. As an alternative, the parting plate 42 can be made of light plastic coated with a thin metallic plate. The inductance of the sensor coil 82 is detected based on the correlation thereof with the parting plate 42. At the same time, the inductance of reference coil 84 is detected according to the correlation thereof with the reference washer 92. The distance between the reference coil 84 and the reference washer 92 is kept constant by the size of the bobbin 80. By comparing the inductance of the sensor coil 82 with that of the reference coil 84, the inductance variance due to changes in ambient temperature is offset, and the position of the parting plate 42 in which temperature variance is compensated can be detected. The bobbin 80 and the ceramic case 90, which are ceramic, have a minimal dimensional change. As shown in FIG. 4, the position of the parting plate 42 can be detected without being influenced by a thermal change. When the volume of injected fuel is measured, however, the temperature of the displacement sensor 52 rises as the injection frequency increases. Therefore, the mechanism of detecting the position of the parting plate 42 with precision and without undergoing a thermal change is effective as a method of measuring the volume of fuel injected from the injection valve 20 and is applicable in a wide range of testing conditions, and is not affected by seasonal variations. As shown in FIG. 5, for the conventional displacement sensor without a reference coil, drift varies considerably due to a thermal change. Such a drift variance due to thermal change, causes an error in detecting the position of the parting plate 42 and results in an inaccurate measuring of injected fuel volume.

When the injection port 26 of the injection valve 20 injects fuel, the volume of injection chamber 28 increases by the injected fuel volume V. At the time of injection of the fuel the discharge valve 31 as well as the safety valve 32 are closed, so the increased volume V of fuel moves the parting plate 42 toward the right (in FIG. 1). The displacement of the parting plate 42 is defined as "S". The effective area of the parting plate 42 (the area facing the back pressure chamber 50) is defined as "A". The displacement S and the effective area A establish a following relationship:

$$S = V/A \qquad (1)$$

The volume of the fuel injected by the injection valve 20 is defined as "V", which is obtained as follows based on the formula (1) using the displacement S of the parting plate 42 detected by the displacement sensor 52:

$$V = A \times S \qquad (2)$$

Respectively prior to and after the injection of fuel, the displacement sensor 52 detects the position of the parting plate 42. The difference between the two detected positions is the displacement S of the parting plate 42. The angle signal from the angle sensor 7 attached on the rotating shaft of the motor 5 in FIG. 2 determines the respective timings of the detection of the parting plate's position. The parting plate 42 has the distance "d" from the left end of the displacement sensor 52 and collar 54 (in FIG. 3) so that the parting plate 42 is not contacted therewith even when maximum measurable volume of fuel is injected.

The vibration-damping member 44 weakens the force of a jet of fuel which comes from the ignition port 26 through fuel filled in the injection chamber 28 to the parting plate 42. The vibration-damping member 44 thus prevents the parting plate 42 from vibrating and impairing the precision of detecting the position thereof. The vibration-damping member 44 also prevents the jet force from hitting obliquely the parting plate 42 or directly hitting bellows 36. Such an effect of damping vibration improves the precision with which the position of parting plate 42 is detected and maintains the proportionality of injected volume V of the fuel and displacement S of the parting plate 42. The aforementioned function restricts the material of the vibration-damping member 44 to a porous sintered metal. Instead, a circular plate having several holes or a cylinder having a hole in the center thereof can be used.

The bellows 36 is defined with the cylindrical inner wall of the lower body 24 and contains the collar 54 therein. The pressure inside the bellows 36 is maintained equal to that outside, therefore, even at the time of injection of the fuel from the injection port 26, the bellows 36 deforms only to move the parting plate 42 horizontally, whereby the proportionality of the volume V of the injected fuel and the displacement S of the parting plate 42 is assured. As a material of collar 54, rubber, ceramic, etc. can be used instead of rigid plastic.

After injecting fuel, detecting the displacement of parting plate 42 and measuring the volume of the injected fuel, the discharge valve 31 discharges fuel from the injection chamber 28 to the tank 8. Fuel is discharged until the parting plate 42 returns to the specified range of the position before injection of fuel. The range of position of the parting plate 42 is specified so that the parting plate 42 does not contact the displacement sensor 52 after injection of fuel from the injection port 26. Both before and after injection of fuel, the parting plate 42 is kept floating in the fuel in the injection chamber 28 without touching the cylindrical inner wall of the lower body 24. The parting plate 42 does not touch the displacement sensor 52, etc., so no oscillation arises. Therefore, a volume of fuel injected especially at high frequency can be measured with improved precision. Movable portions of the measuring apparatus 22 at the time of fuel injection are confined to the thin parting plate 42 and light bellows 36, so inertia force is small and the responsibility to high frequency testing is optimum. Fuel can be discharged from the injection chamber 28 once after injected several times, not every time after injection.

In this embodiment of the invention, the pressure in the injection chamber 28 is kept the same as that in the back pressure chamber 50. Therefore, both during injection and non-injection, bellows 36 do not deform due to the difference in internal and external pressure. The proportionality of the displacement S of the parting plate 42 and the volume increment in injection chamber 28, namely, the volume V of the injected fuel is assured. The pressure in the injection chamber 28 can be selected from the range from atmospheric pressure to 150 kg/cm². Consequently, volume V of injected fuel can be measured under the almost actual condition of the fuel injection into the diesel engine combustion chamber from the injection valve 20. Under the usual testing condition, the pressure is more than 30 kg/cm². Therefore, the effect of the prior art is maintained that the generation of bubbles in the fuel in the injection chamber 28 is prevented and the volume of an injected fuel is precisely measured.

Thus it should be understood that although a certain specific embodiment of the invention has been shown and described for the purpose of illustration, it will of course be apparent that the invention is not limited to the embodiment illustrated and described, but in its broadest aspects it includes all equivalent embodiments and modifications which come within the scope of the invention.

We claim:

1. Apparatus for measuring the volume of a fluid injected by an injection valve being tested comprising:
   an injection chamber which is filled with fluid the same as that to be injected therein by an injection valve, said filling fluid having a predetermined pressure and the valve being mountable to inject the fluid to be measured into said chamber;
   a back pressure chamber which is filled with a gas having the same predetermined pressure as that of said filling fluid;
   a movable member partitioning said chambers one from the other and which member moves a distance corresponding to an increment of volume of said injection chamber due to an injection of fluid thereinto from the injection valve;
   means of a non-contact type for measuring the displacement of said member due to an injection; and
   means for discharging a volume of fluid from said injection chamber and for controlling the volume of the discharge to maintain said member in a predetermined zone during injection and non-injection by the injection valve.

2. A measuring apparatus as claimed in claim 1, wherein said back pressure chamber communicates with a reservoir tank via a pressure regulator.

3. A measuring apparatus as claimed in claim 2, wherein said pressure regulator regulates the pressure in said back pressure chamber in the range from atmospheric pressure to a pressure 150 kg/cm$^2$.

4. A measuring apparatus as claimed in claim 1, wherein said movable member comprises a cylindrical bellows and a non-deformable parting plate attached to an end of said bellows.

5. A measuring apparatus as claimed in claim 4 wherein the parting plate is made of metal and the measuring means includes a sensing coil fixed within the bellows opposed to said plate, a reference coil for compensating temperature change fixed within said bellows on that side of said sensing coil opposite said plate and a reference washer made of metal fixed within said bellows on that side of said reference coil opposite said sensing coil.

6. A measuring apparatus as claimed in claim 5, wherein said sensor coil and reference coil are wound on a ceramic bobbin housed in a ceramic case.

7. A measuring apparatus as claimed in claim 4, wherein the measuring means comprises a displacement sensor plate housed in said cylindrical bellows which projects into said injection chamber.

8. A measuring apparatus as claimed in claim 7, wherein a collar is disposed between said bellows and said displacement sensor for preventing said bellows from deforming.

9. A measuring apparatus of a volume of an injected fluid as claimed in claim 4, wherein said predetermined zone is a zone in which said parting plate is in contact only with said bellows during injection and non-injection of the injection valve.

10. A measuring apparatus as claimed in claim 1, wherein said injection chamber communicates with a safety valve and the controlling means comprises a discharge valve.

11. Measuring apparatus as claimed in claim 1 including a vibration damping member disposed in said injection chamber in a position to shield the movable member from an injection.

12. A measuring apparatus as claimed in claim 11, wherein said vibration damping member is made of porous and sintered metallic material.

* * * * *